(12) United States Patent
Hammes et al.

(10) Patent No.: US 7,274,763 B2
(45) Date of Patent: Sep. 25, 2007

(54) UNIT FOR DETERMINING THE SAMPLING PHASE

(75) Inventors: Markus Hammes, Dinslaken (DE); Christian Kranz, Ratingen Lintorf (DE); Johannes Van Den Boom, Meerbusch (DE)

(73) Assignee: Infineon Technologies AG, Munich (DE)

( * ) Notice: Subject to any disclaimer, the term of this patent is extended or adjusted under 35 U.S.C. 154(b) by 742 days.

(21) Appl. No.: 10/642,547

(22) Filed: Aug. 15, 2003

(65) Prior Publication Data

US 2004/0151262 A1   Aug. 5, 2004

Related U.S. Application Data

(63) Continuation of application No. PCT/DE02/00063, filed on Jan. 10, 2002.

(30) Foreign Application Priority Data

Feb. 15, 2001 (DE) ................................ 101 07 144

(51) Int. Cl.
*H04L 7/00* (2006.01)

(52) U.S. Cl. .................... 375/355; 375/365; 370/514

(58) Field of Classification Search ............... 375/340, 375/342, 343, 355, 365; 370/509, 514
See application file for complete search history.

(56) References Cited

U.S. PATENT DOCUMENTS

| | | | |
|---|---|---|---|
| 4,414,676 A | | 11/1983 | Kraul et al. |
| 4,984,249 A | | 1/1991 | Long et al. |
| 5,400,368 A | * | 3/1995 | Cheng et al. ............... 375/354 |
| 5,699,389 A | * | 12/1997 | Beladi et al. ............... 375/371 |
| 5,862,156 A | | 1/1999 | Huszar et al. |
| 6,118,833 A | | 9/2000 | Bergmans et al. |
| 6,154,506 A | * | 11/2000 | Ishikawa et al. ............ 375/326 |
| 6,567,480 B1 | * | 5/2003 | Brardjanian et al. ........ 375/331 |

FOREIGN PATENT DOCUMENTS

GB   2 206 267 A   12/1988

OTHER PUBLICATIONS

Qureshi: "Timing Recovery for Equalization Partial-Response Systems", IEEE Transactions on Communications, Dec. 1976, New York, NY USA, XP-000808451, pp. 1326-1331.

Meyr, et al.: "Digital Communications Receivers-Synchronization, Channel Estimation, and Signal Processing", Wiley & Sons, ISBN 0-471-50275-8, New York, NY, USA, XP-002246463; pp. 296-297, Oct. 20, 1997.

Qureshi, S. U. H. et al.: "Timing Recovery for Equalized Partial-Response Systems", IEEE Transactions on Communications, vol. 24, No. 12, Dec. 1976, p. 1326-1331.

(Continued)

*Primary Examiner*—Khanh Tran
(74) *Attorney, Agent, or Firm*—Laurence A. Greenberg; Werner H. Stemer; Ralph E. Locher

(57) ABSTRACT

The invention relates to an apparatus and a method for ascertaining and correcting the optimum sampling time for an oversampled input bit stream. This involves feeding the data bit blanked with the current sampling phase into the comparative sequence and using the data bit to ascertain a new, corrected sampling phase. This decision-based approach enables the sampling phase to be continuously corrected.

22 Claims, 2 Drawing Sheets

OTHER PUBLICATIONS

Meyr, H. et al.: "Digital Communications Receviers. Synchronization, Channel Estimation, and Signal Processing", Siley & Sons, pp. 296-297, Oct. 20, 1997.

Lin, J. et al.: "Fading Channel Tracking Properties of Several Adaptive Algorithms for the Northern American Digital Cellular System", IEEE, May 18, 1993, pp. 273-276.

* cited by examiner

UNIT FOR DETERMINING THE SAMPLING PHASE

CROSS-REFERENCE TO RELATED APPLICATION

This application is a continuation of copending International Application No. PCT/DE02/00063, filed Jan. 10, 2002, which designated the United States and was not published in English.

BACKGROUND OF THE INVENTION

Field of the Invention

The invention relates to an apparatus and a method for ascertaining and correcting the optimum sampling time for an oversampled digital bit stream.

In cordless communication systems, the data are transmitted in the form of a frame structure. Before the data packets are transmitted, synchronization words are transmitted which are known at the receiver. The synchronization word and the data packet together produce a data burst. The synchronization word at the start of the burst is first used to identify the burst. Second, this synchronization word can be used to determine the optimum sampling phase for the receiving bit stream. When a digital modulation method is available, this sampling phase is chosen such that sampling respectively takes place in the center of the symbol period and hence at the maximum opening of the eye diagram.

Following demodulation, the receiver has a pulse-amplitude modulated received signal which codes the binary data. This received signal is supplied to a comparator whose output delivers the value 0 or the value 1, according to whether the received signal is less than or greater than 0. The actual conversion of the received signal into a sequence of discrete values is effected by cyclically sampling the comparative output.

To determine the optimum sampling time, it is advantageous for the output signal from the comparator to be sampled a plurality of times within the symbol period using a particular oversampling ratio (OSR). For each data symbol, n different samples are ascertained in this manner. Of these samples, only the respective value associated with the optimum sampling time is processed further, and the remaining (n−1) values are ignored.

To determine the optimum sampling time, it is known practice to compare the oversampled binary data with the synchronization word known to the receiver at the start of reception of a data burst. This is done using a correlator that compares the input data stream with the synchronization word bit by bit and ascertains an associated correlation value. With undisturbed received signals, the first and last occurrence of correlation is at the start and end of a symbol period, and the sampling time is chosen in the center between these two times.

A drawback of this solution is that the optimum sampling phase is determined only once for each data burst, specifically at the start of reception of the data burst. The sampling phase ascertained at the beginning is then used to sample the entire data burst. Any signal disturbances at the start of a burst result in the sampling phase being stipulated incorrectly at the beginning. This incorrect sampling phase is then used to sample the entire data burst, and high bit-error rates are obtained. Another drawback is that it is not possible to compensate for any drift in the time references of the transmitter and receiver by correcting the sampling phase, because the sampling phase stipulated at the beginning remains constant for an entire respective data burst.

SUMMARY OF THE INVENTION

It is accordingly an object of the invention to provide an apparatus and a method for ascertaining and correcting the optimum sampling time for an oversampled bit stream, which overcomes the above-mentioned disadvantages of the prior art apparatus and methods of this general type.

In particular, it is an object of the invention to reduce the bit-error rate as compared with the prior art.

The starting point is an oversampled digital bit stream, where samples taken at n different sampling times are available for each bit. The inventive apparatus for ascertaining and correcting the optimum sampling time includes a reading unit that reads the next bit from the oversampled digital bit stream at the respective optimum sampling time. In addition, the apparatus includes a unit for ascertaining the correlation between the sequence of sampled data bits and a comparative sequence. The new optimum sampling time is stipulated by a unit for determining the new optimum sampling time on the basis of the correlation values ascertained at the various sampling times.

Unlike in the prior art, the comparative sequence used is a continuous bit pattern, with the respective bit read at the optimum sampling time being fed into the comparative sequence. Whereas, in the prior art, the synchronization word transmitted at the start of the data burst is used as the comparative sequence, the comparative sequence in the case of the inventive solution is produced by evaluating the received data stream. The currently read data bit is respectively used for updating the comparative sequence. By correlating this comparative sequence with the oversampled input data stream, it is possible to ascertain a new optimum sampling time. The next bit can then be read by the reading unit at the actual newly determined optimum sampling time. This bit is also fed into the comparative sequence again, so that the rotary method allows continual redetermination and correcting of the optimum sampling time.

One advantage of the inventive solution is that the optimum sampling phase can be ascertained at any desired time within the data burst.

Whereas, in the prior art, the optimum sampling phase has been ascertained using the correlation with the synchronization word transmitted at the beginning and was therefore able to be stipulated only at the start of the data burst, the inventive solution allows the optimum sampling time to be determined at any desired point within the data burst. In particular, this enables the optimum sampling time to be determined a plurality of times during a data burst. In this respect, the invention permits continual redetermination and correcting of the optimum sampling time during the reception of a data burst. This allows the bit-error rate to be significantly reduced.

Any signal disturbance at the start of transmission of the data burst can prompt the incorrect initial setting of the optimum sampling time. The inventive solution makes it possible to correct the incorrect sampling time while the data burst is still being received. This means that the rest of the data burst can be received correctly.

Continually correcting the sampling phase is advantageous particularly when there is a drift between the time references of the transmitter and the receiver. The result of such a drift is that a sampling phase that has been determined correctly at the beginning produces incorrect reading results after a short time. By contrast, the inventive correcting of the optimum sampling time allows good reading results even when there is a timing drift between the transmitter and the receiver, since the sampling phase is altered in line with the drift.

From the prior art, hardware for determining the sampling phase is known in which the correlation between the input data stream and the synchronization word is ascertained for various sampling phases in order to find the optimum sampling phase. In order to get from this previously known hardware to hardware operating on the basis of the invention, it is merely necessary to replace the constant comparative sequence with a continuous bit pattern into which the respective newly read bit is fed. The design alterations to the previously known hardware which are required for this purpose are minimal. In this respect, it is possible to produce a unit for determining the sampling phase which allows constant correcting of the sampling phase with little additional complexity of design.

In line with one advantageous embodiment of the invention, the comparative sequence is stored in a comparative-sequence shift register. The respective bit read at the optimum sampling time is fed into the comparative-sequence shift register. This is the most suitable hardware implementation for storing a continuous bit pattern. The respective bit read at the optimum sampling time is fed into the shift register, so that the shift register constantly contains the current comparative sequence. In this case, the shift register is clocked such that the bit pattern is respectively shifted after a symbol period $T_{Bit}$. The shift-register content is correlated with the arriving digital bit stream in order to ascertain an associated correlation value at each sampling time.

In line with another advantageous embodiment of the invention, the oversampled digital input bit stream is shifted by a sequence of shift registers. Each shift register has n register cells for holding the n samples available for each bit. By way of example, with an oversampling ratio of 9, there are 9 samples for each data symbol in the input bit stream. Accordingly, the ratio between the sampling period $T_s$ and the symbol period $T_{Bit}$ in the case of ninefold oversampling is $$T_s = \frac{T_{Bit}}{9}.$$

To hold the 9 samples taken for each bit, shift registers with 9 register cells each need to be provided. To store a sequence of, by way of example, 16 data symbols in the input bit stream, 16 series-connected shift registers with 9 register cells each are accordingly required. Instead of the sequence of 16 shift registers, one large shift register with 16·9=144 register cells can also be used. The sequence of shift registers is clocked such that the shift register content is respectively shifted one position further when a sampling period $T_s$ has elapsed.

Storing the samples of the oversampled digital input bit stream in such a sequence of shift registers of length n allows for the simple determination of the optimum sampling time or the optimum sampling phase. This involves stipulating which of the n register cells provided for each data symbol needs to be read to obtain the current bit. If, with an oversampling ratio of 9, for example, the respective third register cell of each shift register is read, then the sampling phase is thus stipulated relative to the input bit pattern. The sampling phase used for reading can be altered in the simple manner by respectively using the fourth or fifth register cell of the respective shift register to read the current bit instead of the third one, for example.

It is advantageous to determine the optimum sampling time a plurality of times during a data burst. This allows continuous correcting of the optimum sampling phase. Particularly when there is a clock drift between the reference clock at the transmitter and at the receiver, this makes it possible to ensure that the input signal is respectively sampled approximately in the center of the received data symbol.

It is particularly advantageous in this case if the optimum sampling time is determined a plurality of times during a data burst at cyclic intervals. By way of example, it is possible to stipulate that the optimum sampling time is respectively redetermined after 20 data symbols have been received.

It is advantageous if the comparative sequence is equated to a synchronization word at each start of the reception of a data burst. The synchronization word is respectively transmitted at the start of a data burst and is known at the receiver. In this respect, the sampling phase can be determined for the first time by correlating the input data stream with the previously known synchronization word. As soon as the sampling phase has been determined for the first time, the next bits of the bit stream can be read on the basis of this sampling phase. The data bits obtained in this manner are then successively fed into the comparative sequence and are used to determine the new optimum sampling time.

In line with another advantageous embodiment of the invention, the optimum sampling time is varied only within a prescribed range around the previous optimum sampling time. If readjustment repeatedly obtains incorrect comparative patterns, for example, as a result of greatly disturbed data bits, then redetermination of the sampling phase can result in an incorrect value that differs greatly from the sampling phase used previously. To prevent this, readjustment of the sampling time $t_{adjust}$ is restricted to a particular range around the previously used sampling time $t_{opt}$. This measure makes it possible to prevent the sampling phase from "breaking out" of the plausible range.

It is advantageous if the unit for ascertaining the correlation respectively determines the hamming distance between the sequence of sampled data bits which is associated with a particular sampling time and the comparative sequence. The hamming distance indicates how many bits differ between the sequence of sampled data bits and the comparative sequence. A hamming distance of zero signifies, in this respect, that the sequence of sampled data bits and the comparative sequence are identical. A hamming distance of 1 signifies that the sequence of sampled data bits differs from the comparative sequence by precisely one bit, while all the other bits in the two sequences match. If, by way of example, two sequences each including 16 bits have a hamming distance of 1 or 2 from one another, then the two sequences are greatly correlated. In this respect, the hamming distance between the sequence of sampled data bits and the comparative sequence is a good measure of the correlation between the two sequences. In addition, suitable hardware solutions are available which can be used to calculate the hamming distance between two sequences with little complexity.

It is advantageous if the unit for ascertaining the correlation compares the respective hamming distance ascertained with a prescribed threshold value and, if the hamming distance is below the threshold value, the unit sets an associated correlation flag. If, by way of example, bit errors mean that individual bits in the two sequences to be compared differ from one another, then a hamming distance not equal to zero is obtained. Nevertheless, the two sequences are greatly correlated. In the case of the inventive solution, the existence of correlation between the two sequences is then affirmed if the hamming distance is below a prescribed threshold value. This gives better results than if full identity between the two sequences were demanded.

In line with one advantageous embodiment of the invention, the unit for determining the new optimum sampling time ascertains the new optimum sampling time by considering the sampling-time range within which the hamming distance is below the prescribed threshold value. On account of the oversampling, there exist a plurality of (in the example 9) different samples for each data symbol in the input data stream. For each sampling time, the samples obtained are correlated with the comparative sequence. If correlation exists, that is to say if the hamming distance is below the prescribed threshold value, then an associated correlation flag is set. If the sequence of correlation flags associated with the various sampling times is considered, then it is possible to ascertain the sampling time at which correlation exists for the first time. Accordingly, it is possible to ascertain the sampling time at which the input data sequence and the comparative sequence have sufficient correlation for the last time. The time of first correlation and the time of last correlation stipulate a sampling-time range within which the hamming distance is below the prescribed threshold value. By analyzing this sampling-time range, it is possible to determine the new optimum sampling time.

A particular advantage in this context is when a time, which is in the center of the sampling-time range, is chosen as the new optimum sampling time. Such a choice of sampling time ensures that the bits in the incoming data stream are each sampled in the center.

In the case of the inventive method for ascertaining and correcting the optimum sampling time for an oversampled digital bit stream, where samples taken at n different sampling times are available for each bit, the next bit from the oversampled digital bit stream is first read at the previous optimum sampling time. The bit which is read is fed into the comparative sequence, which is stored as a continuous bit pattern. Next, the correlation between the sequence of sampled data bits and the comparative sequence is ascertained, with an associated correlation value being ascertained at each sampling time. A new optimum sampling time is then determined from the correlation values ascertained at the various sampling times.

Up until now, the comparative sequence used has been the synchronization word known at the receiver. Such a choice of comparative sequence only allowed the optimum sampling phase to be stipulated at the start of a data burst. In the case of the inventive solution, the comparative sequence is respectively complemented by the currently read bit. This allows the optimum sampling time to be redetermined within a data burst as well. In this way, the sampling phase can be corrected continuously, and this results in a significantly reduced bit-error rate.

Other features which are considered as characteristic for the invention are set forth in the appended claims.

Although the invention is illustrated and described herein as embodied in a unit for determining the sampling phase, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
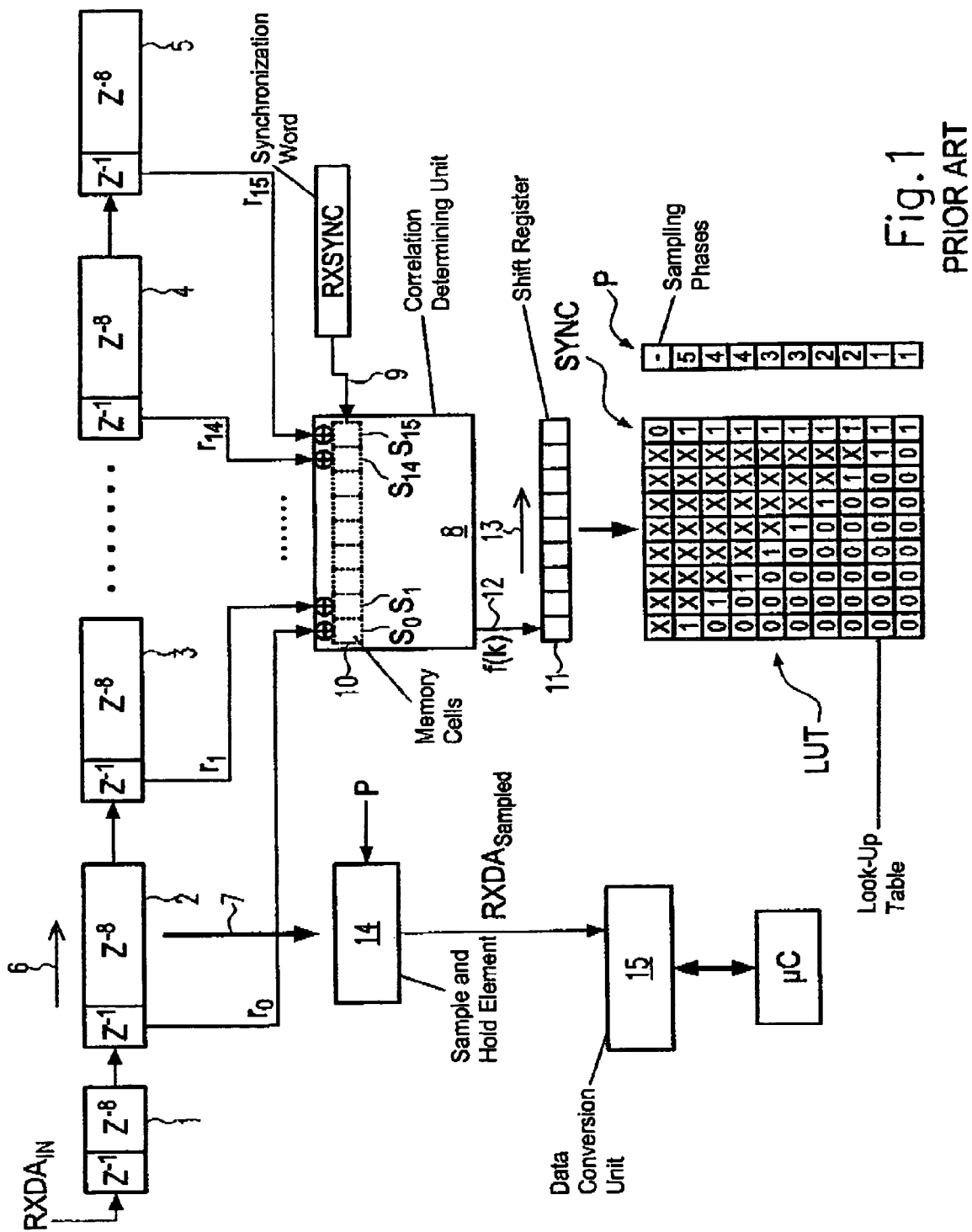
FIG. 1 is a block diagram of a prior art unit for determining the optimum sampling phase for an oversampled bit stream.

Referring now to the figures of the drawing in detail and first, particularly, to FIG. 1 thereof, there is shown a prior art unit for determining the sampling phase, where the sampling phase is stipulated at the start of a data burst for the entire data burst. To this end, the input data stream is correlated with the synchronization word known at the receiver in order to derive the optimum sampling phase from the correlation result.

This is done by sampling the pulse-amplitude modulated received signal a plurality of times within a symbol period $T_{Bit}$ on the basis of a particular oversampling ratio (OSR), so as to obtain n samples for each received data symbol. In the example shown in FIG. 1, n=9, that is to say there are 9 samples available for each data symbol.

The oversampled digital bit stream $RXDA_{IN}$ is shifted by an arrangement of series-connected shift registers 1, 2, . . . , 5.

The clock frequency of the shift registers is given by $$\frac{1}{T_S}.$$

In this context, $T_s$ denotes the sampling period, that is to say the interval of time between two samples. Each of the shift registers 1, 2, . . . , 5 includes n=9 different shift register cells for holding the digitized samples. The direction of advance in the shift registers is identified by the arrow 6.

Each of the shift registers 1, 2, . . . , 5 contains the designations $Z^{-1}$ and $Z^{-8}$. $Z^{-1}$ denotes a delay by one sampling period $T_s$, and accordingly $Z^{-8}$ denotes a delay by 8 sampling periods $8 \cdot T_s$. All in all, each of the shift registers 1, 2, . . . , 5 therefore brings about a delay of 9 sampling periods, or (on account of $9 \cdot T_s = T_{Bit}$) of one symbol period $T_{Bit}$.

The shift register arrangement including the shift registers 1, 2, . . . , 5 enables a simple stipulation of the sampling phase by virtue of selecting one of the n shift register cells in the shift register 2, for which the next data symbol value is then read (7). The sampling phase is thus stipulated by selecting one of the n shift register cells in the shift register 2.

To ascertain the optimum sampling phase, the contents $r_0$, $r_1$, . . . , $r_{14}$, $r_{15}$ of the respective first cell in the shift registers 2, 3, . . . , 5 are read at the sampling frequency $$\frac{1}{T_S}$$

and are supplied to the unit 8 in order to ascertain the correlation. There, the correlation of the input data sequence $$\{r(k \cdot T_s - m \cdot T_{Bit})\}_{0 \leq m \leq 15} = \{r(k \cdot T_s), r(k \cdot T_s - T_{Bit}), \ldots ,$$

$$r(k \cdot T_s - 15 \cdot T_{Bit})\}$$

$$= \{r_0, r_1, \ldots, r_{14}, r_{15}\}$$

is correlated with the known, for example 16-bit long, synchronization word $$\{s(m \cdot T_{Bit})\}_{0 \leq m \leq 15} = \{s_0, s_1, \ldots , s_{14}, s_{15}\}$$

in order to ascertain an associated correlation value for each sampling phase k. For this purpose, the synchronization word RXSYNC is written (9) to the memory cells 10 provided for this purpose. The correlation value used is the hamming distance d(k) between the input data sequence, on the one hand, and the synchronization word on the other. The hamming distance is calculated at each of the times $k \cdot T_s$:

$$d(k) = \sum_{m=0}^{15} s_m \oplus r_m.$$

The hamming distance indicates how many bits differ between the sequence of received data:

$$\{r(k \cdot T_s - m \cdot T_{Bit})\}_{0 \leq m \leq 15},$$

and the comparative sequence:

$$\{s(m \cdot T_{Bit})\}_{0 \leq m \leq 15}.$$

In the present example, the two sequences are each 16 bits long.

To establish whether there is sufficiently great correlation between the input bit sequence and the comparative sequence, the hamming distance d(k) is compared with a selectable threshold value $d_{max}$. If $d(k) \leq d_{max}$, then the two sequences are correlated.

At the start of each data burst, the synchronization word is transmitted. Let $k_1 \cdot T_s$ be the time at which correlation exists for the first time, that is to say at which $d(k_1) \leq d_{max}$.

This time is referred to as SYNC. The correlation flag $f(k_1)$ associated with the time $k_1$ is set:

$$f(k_1) = 1$$

For the next 8 times $k = k_1+1, k_1+2, \ldots , k_1+8$, the associated hamming distances d(k) are respectively ascertained and are compared with $d_{max}$. If the hamming distances are below the threshold value $d_{max}$, the associated correlation flag is set:

$$f(k) = \begin{pmatrix} 1 \text{ for } d(k) \leq d_{max} \\ 0 \text{ for } d(k) \triangle d_{max} \end{pmatrix}$$

The correlation flags f(k) determined in this manner, where $k = k_1+1, k_1+2, \ldots , k_1+8$, are written (12) to a correlation-flag shift register 11 by the correlation determining unit 8 for determining the correlation. The direction of advance in the correlation-flag shift register 11 is given by the arrow 13 in this case.

From the correlation flags' bit sequence, which is stored in the shift register 11 and includes 9 bits, it is possible to determine the optimum sampling time $$t_0 = k_0 \cdot T_s + m \cdot T_{bit}.$$

The pulse-amplitude modulated signal available prior to oversampling can be asymmetrically deformed. In this case, it can be advantageous to align the sampling time with the time of maximum amplitude by slightly shifting the sampling time with respect to the central sampling time. This can be done using an arbitrarily selectable additional time offset $k_2 \in \{-2;-1;0;1;2;3\}$.

In this respect, $$k_0 = k_1 + P + k_2$$

is valid for the time index $k_0$, where P denotes the sampling phase and $k_2 \in \{-2;-1;0;1;2;3;\}$ denotes an arbitrarily selectable time offset.

First, the optimum sampling time $t_0$ is chosen precisely in the center between the time at which correlation starts and the time of last correlation. If $k_1$ denotes the index of the first occurrence of correlation and $k_1+n_1$ denotes the index of the last occurrence of correlation (that is to say $f(k_1)=1$ and $f(k_1+n_1)=1$), then the sampling phase P obtained is $$P = \left[\frac{n_1}{2}\right] + 1.$$

In the case of the implementation shown in FIG. 1, the bit pattern stored in the correlation-flag shift register 11 is converted into the associated sampling phase P using a lookup table LUT. The lookup table LUT is read at the time at which the shift-register cell on the extreme right of the correlation-flag shift register 11 first assumes the value 1 (that is to say at the time SYNC). The index $n_1$ is then determined by the last (that is to say that on the extreme left) occurrence of a correlation flag having the value "1". The correlation-flag values in between, denoted by "X", are of no significance for determining $n_1$ and P ("don't care bits"). The column on the right next to the lookup table LUT indicates the sampling phases P associated with the various correlation-flag bit sequences.

The sampling phase P is supplied to the sample and hold element 14 and, together with the parameters $k_0$ and $k_2$, determines the time at which a data symbol value or bit 7 from a particular register cell in the shift register 2 needs to be read. The value read is respectively held for a symbol duration of $T_{bit} = 9 \cdot T_s$, and in this way the sampled input signal $RXDA_{Sampled}$ is produced. This signal can be supplied to a microcontroller µC via a data-conversion unit 15, for example.

Figure 2:
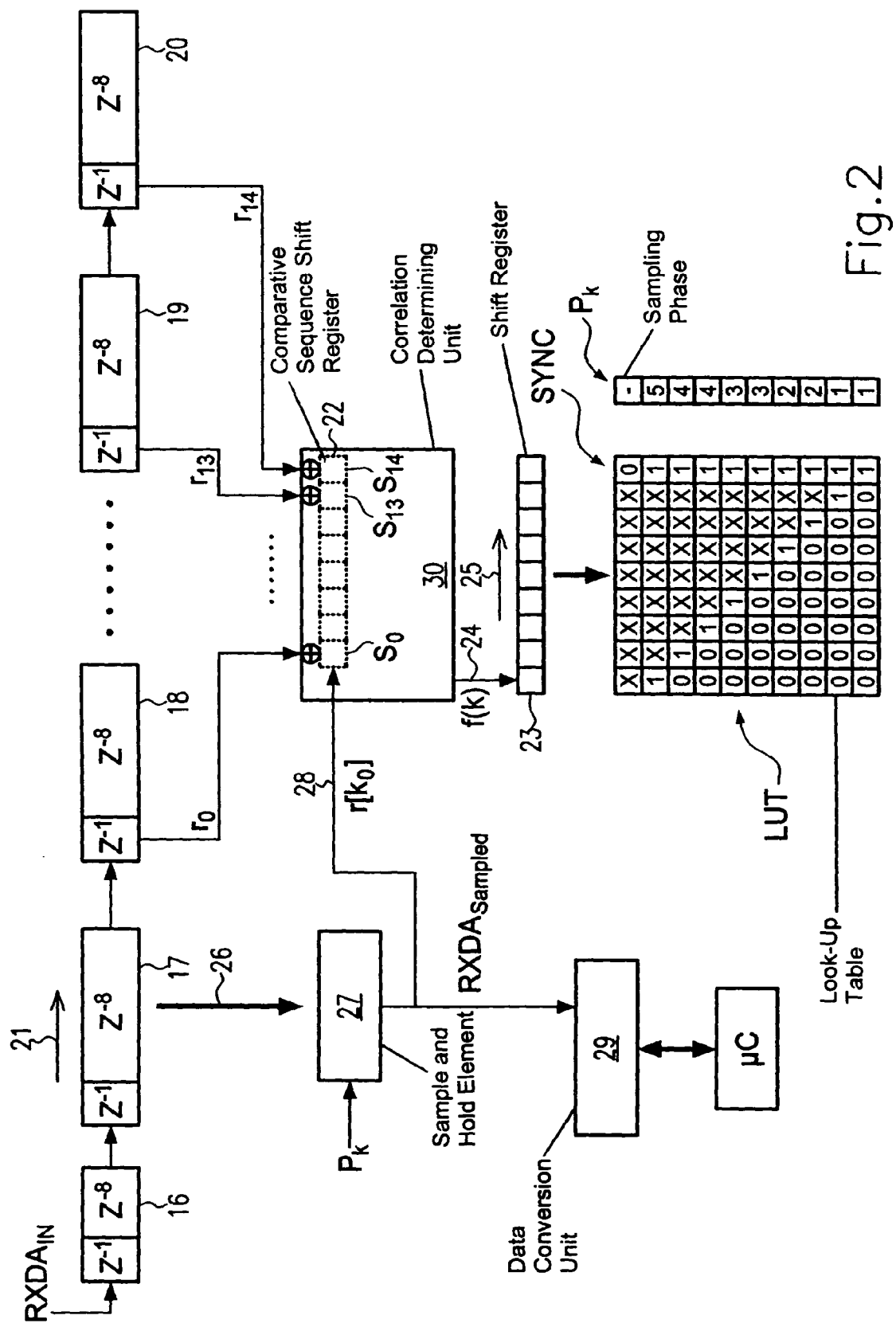
FIG. 2 is a block diagram of an inventive unit for ascertaining the optimum sampling phase for an oversampled bit stream.

FIG. 2 shows an inventive unit for repeatedly redetermining the sampling phase. As in the prior art, a digital bit stream RXDA$_{IN}$ with ninefold oversampling is fed into a sequence of series-connected shift registers 16, 17, ..., 20. Each of the shift registers 16, 17, ..., 20 has nine memory cells and can therefore hold nine sequence samples. Whenever a sampling period T$_s$ has elapsed, the content of the shift registers is shifted further one position to the right. In this case, the arrow 21 indicates the direction of advance in the shift registers.

As in the prior art, the correlation determining unit 30 for determining the correlation has the task of ascertaining a correlation value between the input bit sequence {r$_0$,r$_1$, ..., r$_{14}$} and the comparative sequence at each sampling time. Unlike in the prior art, the two sequences to be compared include only 15 bits each (instead of 16 bits up till now). The comparative sequence {s$_0$, s$_1$, ..., s$_{14}$} is stored in the comparative-sequence shift register 22. To determine the correlation for the first time, that is to say at the start of reception of a data burst, the comparative-sequence shift register 22 contains the lower 15 bits {s$_0$, s$_1$, ..., s$_{14}$} of the synchronization word known at the receiver, which is transmitted at the start of a data burst.

The unit 30 for ascertaining the correlation determines the hamming distance d(k) between the input bit sequence and the comparative sequence for each of the times k·T$_s$. The time k$_1$·T$_s$ denotes the time of first correlation, that is to say the time at which d(k$_1$)≤d$_{max}$ is true for the first time. The associated correlation flag f(k$_1$) is set equal to 1, and this value is written (24) to the correlation-flag shift register 23. Just as described with reference to FIG. 1, the associated correlation flags f(k) are also ascertained for the next 8 hamming distances d(k), where k=k$_1$+1, k$_1$+2, ..., k$_1$+8, and are written to the correlation-flag shift register 23. The values written are shifted from left to right by the shift register as indicated by the arrow 25.

The bit pattern stored in the correlation-flag shift register 23 can be translated, using the lookup table LUT, into the sampling phase P$_k$ for the optimum sampling time t$_0$ situated in the center of the correlation range. In this case, $$t_0 = k_0 \cdot T_s + m \cdot T_{bit}$$

applies, where: k$_0$=k$_1$+P$_k$+k$_2$, k$_1$ denotes the time index for the first occurrence of correlation, P$_k$ denotes the sampling phase, and k$_2$ denotes an arbitrarily selectable time offset with k$_2$ ∈ {−2;−1;0;1;2;3}.

The sampling phase P$_k$ determined in this manner is supplied to the sample and hold element 27. The next bit in the input bit stream is then read 26 at the actual sampling time stipulated by P$_k$. The newly read bit r[k$_0$] is supplied to the microcontroller μC via the data conversion unit 29 as part of the sampled input bit stream RDXA$_{Sampled}$.

Unlike in the prior art, the newly read bit r[k$_0$] is also fed into the comparative-sequence shift register 22 (arrow 28), so that the following new comparative sequence is obtained:

$$\{r[k_0], s_0, s_1, \ldots, s_{13}\}$$

The bit S$_{14}$ of the synchronization word is shifted out of the comparative-sequence shift register 22 by the insertion of r[k$_0$].

Instead of a comparison with the known synchronization word, the invention involves determining the new sampling phase by comparing the input samples with a comparative sequence that is obtained from a decision-based (Decision Directed) evaluation of the received data stream. The decision about the value of the data bit r[k$_0$] is made by reading (26) the input data stream using the previous sampling phase P$_k$.

The new sampling phase P$_{k+1}$ is then ascertained using a modified comparative sequence which is generated on the basis of the decision about r[k$_0$]. The new sampling phase P$_{k+1}$ is determined by correlating the input data stream with the new comparative sequence {r[k$_0$], s$_0$, s$_1$, ..., S$_{13}$}.

Unlike in the prior art, the bit r$_0$ is no longer read from the shift register 17, but rather from the shift register 18. This results in a certain time delay between reading 26 the bit r[k$_0$] required for the comparative sequence, on the one hand, and reading the bit r$_0$ from the input data stream, which means that the value of r[k$_0$], which is required for the comparative sequence, is already available when r$_0$ arrives. On account of this time offset, the inventive solution allows the full sampling-time range from the start of correlation to the end of correlation to be swept between the input sequence and the comparative sequence. It is advantageous in this context if the comparative-sequence shift register 22 is filled with zero at each of the times k$_1$+m·T$_{Bit}$, because this allows for better tracking of the start of correlation.

The newly determined sampling phase P$_{k+1}$ is supplied to the sample and hold element 27. The next input bit can then be read (26) using the actual new sampling phase P$_{k+1}$.

To prevent readjustment from repeatedly obtaining incorrect comparative patterns, for example on account of greatly disturbed data bits, and hence to prevent the newly determined sampling phases from being repeatedly incorrect, readjustment of the sampling phase P$_{k+1}$ needs to be permitted only within a particular range around the initially determined sampling phase P$_{initial}$.

Provision can also be made for the discrepancies between the newly determined sampling phases and the initially determined sampling phase P$_{initial}$ to be added up over a particular period and for readjustment to be performed only if the summed discrepancy exceeds a particular threshold. This measure allows improved robustness to be attained for the control.

The invention permits continuous readjustment of the sampling phase P$_k$ and thus ensures that the individual data symbols arriving are each sampled in the center. This improves the decision for the individual data bits, and the bit-error rate is reduced. In particular, a signal disturbance at the start of the data burst, that is to say when the synchronization word is transmitted, no longer results in incorrect sampling of the entire data burst arriving. Any drift in the time references of the transmitter and receiver can be compensated for by the inventive correcting of the sampling phase.

We claim:

1. An apparatus for ascertaining and correcting an optimum sampling time for an oversampled digital bit stream in which samples are taken at n different sampling times for each bit, the apparatus comprising:

a reading unit for reading each next bit from said oversampled digital bit stream at said optimum sampling time;

a correlation determining unit for determining a correlation between a sequence of sampled data bits and a comparative sequence, said correlation determining unit providing correlation values by determining an associated correlation value at each sampling time; and a unit for determining a new optimum sampling time from said correlation values;

said comparative sequence being a continuous bit pattern; and said bit read at said optimum sampling time being fed into said comparative sequence.

2. The apparatus according to claim 1, further comprising:
a comparative-sequence shift register for storing said comparative sequence;
said bit read at said optimum sampling time being fed into said comparative-sequence shift register.

3. The apparatus according to claim 1, further comprising:
a sequence of shift registers for shifting said oversampled digital bit stream;
each one of said shift registers having n register cells for holding n samples available for each bit.

4. The apparatus according to claim 1, wherein said optimum sampling time is determined a plurality of times during a data burst.

5. The apparatus according to claim 1, wherein said optimum sampling time is determined a plurality of times during a data burst at cyclic intervals.

6. The apparatus according to claim 1, wherein said comparative sequence is equated to a synchronization word at each start of reception of a data burst.

7. The apparatus according to claim 1, wherein said optimum sampling time is varied only within a prescribed range around a previous optimum sampling time.

8. The apparatus according to claim 1, wherein said correlation determining unit determines a hamming distance between said sequence of sampled data bits that is associated with a particular sampling time and said comparative sequence.

9. The apparatus according to claim 8, wherein said correlation determining unit compares said hamming distance with a prescribed threshold value and if said hamming distance is below said threshold value, said correlation determining unit sets an associated correlation flag.

10. The apparatus according to claim 8, wherein said unit for determining said new optimum sampling time determines said new optimum sampling time by considering a sampling-time range within which said hamming distance is below said prescribed threshold value.

11. The apparatus according to claim 8, wherein:
said unit for determining said new optimum sampling time determines said new optimum sampling time by considering a sampling-time range within which said hamming distance is below said prescribed threshold value; and
said new optimum sampling time is chosen as a time that is in a center of said sampling-time range.

12. A method for ascertaining and correcting an optimum sampling time for an oversampled digital bit stream in which samples are taken at n different sampling times for each bit, the method which comprises:
reading a next bit from the oversampled digital bit stream at a previous optimum sampling time;
feeding the bit into a comparative sequence being stored as a continuous bit pattern;
determining a correlation between a sequence of sampled data bits and the comparative sequence, wherein a plurality of correlation values are obtained by determining an associated correlation value at each sampling time; and
determining a new optimum sampling time from the plurality of correlation values.

13. The method according to claim 12, which further comprises storing the comparative sequence in a comparative-sequence shift register by feeding the bit, which has been read at the previous optimum sampling time into the comparative-sequence shift register.

14. The method according to claim 12, which further comprises:
using a sequence of shift registers to shift the oversampled digital bit stream; and
providing each one of the shift registers with n register cells for holding n samples available for each bit.

15. The method according to claim 12, which further comprises performing the step of determining the optimum sampling time a plurality of times during a data burst.

16. The method according to claim 12, which further comprises performing the step of determining the optimum sampling time a plurality of times during a data burst at cyclic intervals.

17. The method according to claim 12, which further comprises equating the comparative sequence to a synchronization word at each beginning of a reception of a data burst.

18. The method according to claim 12, which further comprises situating the new optimum sampling time within a prescribed range around the previous optimum sampling time.

19. The method according to claim 12, which further comprises performing the step of determining the correlation by determining a hamming distance between the sequence of sampled data bits, which is associated with a particular sampling time, and the comparative sequence.

20. The method according to claim 19, which further comprises performing the step of determining the correlation by comparing the hamming distance, which is associated with a particular sampling time, with a prescribed threshold value, and if the hamming distance is below the threshold value, setting a correlation flag.

21. The method according to claim 19, which further comprises performing the step of determining the new optimum sampling time by considering a sampling-time range within which the hamming distance is below a prescribed threshold value.

22. The method according to claim 21, which further comprises choosing a time that is in a center of the sampling-time range, within which the hamming distance is below the prescribed threshold value, as the new optimum sampling time.

* * * * *